(12) United States Patent
van Thiel (10) Patent No.: US 12,240,426 B2
(45) Date of Patent: Mar. 4, 2025

(54) ELECTROPNEUMATIC DEVICE WITH A PROTECTIVE VALVE UNIT

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 184 days.

(21) Appl. No.: 18/303,252

(22) Filed: Apr. 19, 2023

(65) Prior Publication Data

US 2023/0264669 A1    Aug. 24, 2023

Related U.S. Application Data

(63) Continuation of application No. PCT/EP2021/080072, filed on Oct. 29, 2021.

(30) Foreign Application Priority Data

Nov. 2, 2020   (DE) .................... 10 2020 128 746.1

(51) Int. Cl.
*B60T 13/68* (2006.01)
*B60T 13/26* (2006.01)

(52) U.S. Cl.
CPC .......... *B60T 13/683* (2013.01); *B60T 13/263* (2013.01); *B60T 2270/403* (2013.01)

(58) Field of Classification Search
CPC ................ B60T 13/683; B60T 13/263; B60T 2270/403; B60T 13/261
See application file for complete search history.

(56) References Cited

FOREIGN PATENT DOCUMENTS

| DE | 1 282 392 B | 11/1968 |
|----|----|----|
| DE | 10 2007 016 335 A1 | 10/2008 |
| DE | 10 2009 037 636 A1 | 2/2011 |
| EP | 2 133 249 A2 | 12/2009 |
| EP | 3 356 192 A1 | 8/2018 |

OTHER PUBLICATIONS

English translation of the Written Opinion of the International Searching Authority dated Feb. 9, 2022 for International application PCT/EP2021/080072 on which this application is based.
International Search Report of the European Patent Office dated Feb. 9, 2022 for international application PCT/EP2021/080072 on which this application is based.

*Primary Examiner* — Joseph J Dallo
(74) *Attorney, Agent, or Firm* — Walter Ottesen, P.A.

(57) ABSTRACT

An electropneumatic device for a pneumatic braking system, including a compressed air reservoir for providing a reservoir pressure; a brake pressure modulator which receives reservoir pressure and outputs a brake pressure at a brake pressure connection in a manner dependent on electronic braking request signals; a protective valve unit with a protective valve inlet, a first protective outlet and a second protective outlet; the protective valve inlet receiving the brake pressure which it can provide at the first and second protective outlets; a first and a second pressure line; and, a brake actuator that is connected to the pressure lines. The protective valve unit is configured to throttle the brake pressure output at the first protective outlet in the event of leakage of the first pressure line and to throttle the brake pressure output at the second protective outlet in the event of leakage of the second pressure line.

18 Claims, 7 Drawing Sheets

ELECTROPNEUMATIC DEVICE WITH A PROTECTIVE VALVE UNIT

CROSS-REFERENCE TO RELATED APPLICATIONS

This application is a continuation application of international patent application PCT/EP2021/080072, filed Oct. 29, 2021, designating the United States and claiming priority from German application 10 2020 128 746.1, filed Nov. 2, 2020, and the entire content of both applications is incorporated herein by reference.

TECHNICAL FIELD

The disclosure relates to an electropneumatic device for an electronically controllable pneumatic braking system, including a compressed air reservoir for providing a reservoir pressure, an electropneumatic brake pressure modulator that receives reservoir pressure from the compressed air reservoir and outputs a brake pressure at a brake pressure connection in a manner dependent on electronic braking request signals, and a brake actuator that receives the brake pressure. The disclosure further relates to a method and to a commercial vehicle.

BACKGROUND

In pneumatic braking systems, a brake pressure modulator generally supplies brake pressure to brake actuators in order to decelerate or stop a vehicle. Such a brake pressure modulator can be, for example, a front axle modulator, rear axle modulator, auxiliary axle modulator, parking brake modulator, trailer brake pressure modulator or trailer control valve or the like. For example, common service brake actuators, spring brake cylinders or so called combination cylinders, which have a service brake part and a spring brake part, can be used as brake actuators. Unlike service brakes, which are actuated when brake pressure is applied, spring brake actuators are released when brake pressure is applied and are actuated when brake pressure is released due to spring force.

A leak in brake pressure lines is undesirable in all cases. If a leak occurs in the brake pressure line in service brakes, the result is that the brake pressure provided escapes into the environment and the corresponding wheel can no longer be braked or can no longer be braked completely. As a measure, either the corresponding axle is no longer braked and the vehicle is decelerated via the other axles, or the braking of this axle is implemented redundantly via other actuators, such as spring brake parts of combination cylinders. If there is a leak in a compressed air line to a spring brake cylinder, on the other hand, the spring brake cylinder is vented and thus the parking brake is applied. However, due to this leak, the spring brake cylinder can no longer be vented and therefore the parking brake can no longer be released. The vehicle can no longer be moved or towed in this state, that is, with the parking brake engaged.

To prevent this, it is known from DE 10 2007 016 335 A1, for example, to release the spring brake cylinders in this case via a second brake circuit which is fed from a second compressed air reservoir. The second brake circuit is then connected to the corresponding spring brake cylinder via an electromagnetically switchable 3/2 way valve and a shuttle valve so that it can be released in the event of failure of the first brake circuit, for example due to leakage or a line rupture. The disadvantage here is the installation of the additional electromagnetic valve, and redundant dynamic braking via the additional electromagnetic valve is also only possible to a limited extent. A similar solution is known from EP 3 356 192 A1.

In the field of brakes for rail bound trains and locomotives, it is known to use a hose anti rupture valve to brake different axles, as described in DE 1 282 392. The rupture of the hose of one axle does not then mean that the other axle could no longer be braked. Rather, the axle with a broken hose is no longer supplied with compressed air. However, this setup is very complex and requires larger volumes. In addition, there is a problem here in the complicated tuning of the throttles due to the asymmetrical air consumption. This solution is therefore not suitable for use in commercial vehicles in which braking in line with the wheel is required to maintain the stability of the vehicle.

SUMMARY

It is an object of the disclosure to provide an electropneumatic device which allows both safe braking of the axle even in the event of leakage of a brake pressure line or line rupture, and safe and simple release of spring brake cylinders in the event of leakage or rupture of a brake pressure line. In particular, the electropneumatic device of the present disclosure is intended to be suitable for use in autonomous or semi-autonomous vehicles in which manual intervention by a driver is not possible.

In a first aspect, the disclosure achieves the object in an electropneumatic device of the kind mentioned at the outset by providing a protective valve unit having a protective valve inlet, a first protective valve outlet and a second protective valve outlet, wherein the protective valve inlet is connected to the brake pressure connection of the brake pressure modulator, receives the brake pressure and provides it at the first and second protective valve outlets, and a first brake pressure line connected to the first protective valve outlet and a second brake pressure line connected to the second protective valve outlet, wherein the first and second brake pressure lines are connected to the brake pressure actuator. Further, the protective valve unit is configured to throttle or prevent the brake pressure output at the first protective valve outlet in the event of leakage of the first brake pressure line, and to throttle or prevent the brake pressure output at the second protective valve outlet in the event of leakage of the second brake pressure line. The first and second brake pressure lines thus redundantly connect the brake pressure modulator to the brake pressure actuator. In this way, the brake pressure actuator can still be supplied with brake pressure if one of the first and second brake pressure lines has a leak or is broken. On the one hand, the protective valve unit serves to output the brake pressure into the first and second brake pressure lines. It may be provided, for example, that only the first brake pressure line is used during normal operation and that the second brake pressure line is used only when the first brake pressure line ruptures or has a leak. However, it may also be envisaged that in normal operation the brake pressure is provided substantially equally via the two brake pressure lines. Furthermore, the protective valve unit serves to throttle or shut off the broken or leaking line. In this way, on the one hand the reservoir is prevented from being able to run dry, and on the other hand a situation in which braking is no longer possible or the spring brake cylinders are closed and cannot be opened is prevented.

This is particularly advantageous for autonomous or semi-autonomous vehicles. The inventors have recognized that for the operation of autonomous or semi-autonomous vehicles, special devices are required to implement fault tolerant systems which, in particular, can manage without human intervention. The present disclosure discloses a pneumatic device that accomplishes this task.

In a first embodiment, a shuttle valve is further provided, which is connected on the one hand to the first and second brake pressure lines and on the other hand to the brake pressure actuator. Such a shuttle valve is preferably configured as a select high valve and preferably has a first shuttle valve connection, a second shuttle valve connection and a third shuttle valve connection. The third shuttle valve connection is connected to the brake pressure actuator. The first shuttle valve connection is preferably connected to the first brake pressure line, and the second shuttle valve connection is connected to the second brake pressure line. Preferably, the shuttle valve is configured to send the higher of the pressure applied to each of the first and second shuttle valve connections to the third shuttle valve connection. The other shuttle valve connection is then preferably closed. The shuttle valve can be arranged directly on the brake pressure actuator or integrated into it.

It can be preferred that the protective valve unit is arranged directly on the brake pressure modulator or integrated with it. This creates a robust unit and avoids further potential sources of error between the brake pressure modulator and the protective valve unit.

It may further be provided that the electropneumatic device has a second brake actuator connected to the first and second brake pressure lines for receiving brake pressure. Preferably, a second shuttle valve can also be disposed between the second brake pressure actuator and the first and second brake pressure lines. Preferably, the second shuttle valve may be configured and arranged like the shuttle valve described above. In this way, the brake pressure modulator and the protective valve unit can be used to supply two brake pressure actuators, in particular if the brake pressure actuator is of single channel configuration. However, further brake pressure actuators, such as three, four, five or six, can also be actuated in addition via the protective valve unit. It is also possible for the protective valve unit to have a multi-channel configuration. A multi-channel brake pressure modulator can also be equipped with only one protective valve unit, which in this case can have a single or multi-channel configuration.

In an embodiment, it is provided that the brake pressure modulator is connected to a second compressed air reservoir and the second compressed air reservoir provides a second reservoir pressure at the brake pressure modulator. This provides further redundancy. A shuttle valve can again preferably be arranged between the first and second compressed air supplies and the brake pressure modulator, so that the higher of the first and second reservoir pressures from the first and second compressed air reservoirs is provided to the brake pressure modulator.

Preferably, the electropneumatic device can include a first diagnostic unit for determining a leakage of the first brake pressure line and a second diagnostic unit for determining a leakage of the second brake pressure line, wherein the first and second diagnostic units are connected to the same electronic control unit. Preferably, a first pressure sensor for determining the brake pressure in the first brake pressure line and a second pressure sensor for determining the brake pressure in the second brake pressure line are further provided, wherein the first and second pressure sensors are preferably connected to the same electronic control unit. The first and second pressure sensors may be associated with or part of the first and second diagnostic units. For example, the first and second diagnostic units or pressure sensors may be connected to a central unit of the brake system in which the electropneumatic device according to the present disclosure is formed, or the first and second diagnostic units or pressure sensors may provide their signal via a vehicle bus or other bus system, or the first and second diagnostic units or pressure sensors may be connected to an electronic control unit of the brake pressure modulator. This allows early detection of faults, which is particularly advantageous in a highly automated and/or driverless vehicle in which leakages or line ruptures cannot be detected via the senses of the human driver. Alternatively or in addition to the first and second pressure sensors, additional valves can also be provided via which such a diagnosis can also be carried out.

In a further embodiment, it is provided that a brake actuator protective unit is connected on the one hand to the first and second brake pressure lines and on the other hand to the brake pressure actuator. Such a brake actuator protective unit is preferably connected between the brake pressure lines and the brake actuator instead of the shuttle valve described above. The brake actuator protective unit can be identical or analogous in configuration to the protective valve unit. In this way, equivalent advantages can result which can then be implemented in the braking system.

In a first specific implementation of the protective valve unit, it includes a valve body which has the protective valve unit inlet, the first protective valve outlet and the second protective valve outlet as well as a working chamber in which a valve element is movably arranged between the first and the second protective valve outlets. The valve element is preferably in a first end position resting against a first valve seat associated with the first protective valve outlet, and in a second end position rests against a second valve seat associated with the second protective valve outlet. Preferably, the protective valve unit further has a first throttled bypass connecting the protective valve inlet to the first protective valve outlet and a second throttled bypass connecting the protective valve inlet to the second protective valve outlet. For example, if pressure drops at the first protective valve outlet because the first brake pressure line is broken, there is thus a pressure differential from the first protective valve connection to the second protective valve connection, and the valve element is pushed toward the first valve seat, allowing the first protective valve outlet to be shut off. Compressed air can then still flow via the throttled bypass toward the first brake pressure line, but this is a small volume flow that has little effect on braking performance. On the other hand, during normal operation, the first and second bypasses may serve to keep the valve element substantially in the center of the working chamber to allow even utilization of the first and second brake pressure lines, or to return the valve element to the center if it has left the center. Alternatively, or in addition to the bypasses, one or more springs may be provided to load the valve element toward the center, that is, a neutral position.

Furthermore, it is also possible for the protective valve unit to have a first pneumatically switchable valve and a second pneumatically switchable valve. The first pneumatically switchable valve is preferably associated with the first brake pressure line and the second pneumatically switchable valve is preferably associated with the second brake pressure line. The first and second pneumatically switchable valves are preferably configured such that the first pneumatically switchable valve throttles or blocks the brake pressure output at the first protective valve outlet in the event of leakage of the first brake pressure line, and the second pneumatically switchable valve throttles or blocks the brake pressure output at the second protective valve outlet in the event of leakage of the second brake pressure line. In this way, the same functionality as described above can be implemented, wherein the first and second pneumatically switchable valves have a high level of fail safety and allow large cross sections and simple diagnostics.

Preferably, the first pneumatically switchable valve has a first switching position, a second switching position, a first control connection and a second control connection, wherein the first pneumatically switchable valve is loaded or switched into the first switching position when a first control pressure is output at the first control connection and is loaded or switched into the second switching position when a second control pressure is output at the second control connection. It may also be provided that the first pneumatically switchable valve not only has two defined end positions, but also permits intermediate positions between the first and second switching positions. The second pneumatically switchable valve preferably also has a third switching position, a fourth switching position, a third control connection and a fourth control connection. When a third control pressure is output at the third control connection, the second pneumatically switchable valve is then preferably loaded or switched into the third switching position, and when a fourth control pressure is output at the fourth control connection, it is loaded or switched into the second switching position. The second pneumatically switchable valve can also have intermediate positions. In fault free normal operation, the first and second control pressures and the third and fourth control pressures are output substantially simultaneously, resulting in symmetrical loading of the first and second pneumatically switchable valves. Only in the event of a leakage or a rupture in the line does an asymmetry occur, which then results in switching of the corresponding valve.

Preferably, in the first and third switching position of the first and second pneumatically switchable valve, respectively, the protective valve inlet is connected to the first or second protective valve outlet in an unthrottled manner. In the second switching position and the fourth switching position of the first and second pneumatically switchable valve, respectively, the protective valve inlet is preferably connected in a throttled manner to the first or second protective valve outlet. In this respect, a throttle is preferably integrated into the valve in the second and fourth switching position of the first and second pneumatically switchable valve, respectively.

Preferably, the first control pressure corresponds to the first brake pressure from the first brake pressure line or a pressure derived therefrom. The third control pressure preferably also corresponds to the second brake pressure from the second brake pressure line or a pressure derived therefrom. In this respect, for example, a first control line may lead from the first brake pressure line to the first control connection and a third control line may lead from the second brake pressure line to the third control connection. These control lines can be configured with a small volume.

Furthermore, it is preferably provided that the second control pressure corresponds to the second brake pressure in the second brake pressure line or a pressure derived therefrom. The fourth control pressure then preferably corresponds to the first brake pressure in the first brake pressure line or a pressure derived therefrom. For this purpose, a second control line may lead from the second brake pressure line to the second control connection, and a fourth control line may lead from the first brake pressure line to the fourth control connection. Again, these may be formed with a small cross section. Alternatively or additionally, it may also be provided that the second and fourth control pressures correspond to a pressure applied to the protective valve inlet or derived therefrom. In this respect, a control line branching off from the protective valve inlet can also lead to the second and fourth control connections.

Preferably, the first and second pneumatically switchable valves are spring biased into an open, unthrottled switching position. When the electropneumatic device is functioning properly and both brake pressure lines are used to deliver brake pressure from the brake pressure modulator to the brake actuator, all of the control lines in the previously described embodiment, that is, the first, second, third, and fourth control lines or all of the control connections are also vented and at the same pressure. In order to then bring or hold the first and second pneumatically switchable valves into the open position, these are preferably spring biased into the open switching position. Alternatively, the control line leading to the second and fourth control connections could also be configured with a small cross section so that the pressure is further throttled. However, this can then also result in the dynamics of the system being reduced. In another embodiment, a throttle and/or an enlarged control volume is arranged between the protective valve inlet and the second and/or fourth control connection. The throttle serves to actuate a throttled pressure at the second and fourth control connections rather than the pressure directly actuated at the protective valve inlet. Preferably, an enlarged control volume is provided, specifically downstream of the throttle, to provide a further reduction.

In a variant of the embodiment of the electropneumatic device, the brake pressure modulator is an axle modulator and the at least one brake actuator is a service brake actuator. For example, the brake pressure modulator is configured as a front axle modulator, in particular a single channel front axle modulator, wherein a total of four brake pressure lines are connected to the protective valve unit, two leading to a left front axle brake actuator and two leading to a right front axle brake actuator. Alternatively, the brake pressure modulator can be a parking brake modulator and the brake actuator is a spring brake actuator. Again, one, two, three, four or more spring brake actuators can be connected to the protective valve unit of the parking brake modulator. Alternatively, a separate protective valve unit can also be provided for each brake actuator.

In a second aspect, the disclosure achieves the object stated at the outset by providing a method for actuating a brake pressure in an electronically controllable pneumatic braking system in a manner that protects against pipe rupture, including the steps of:

receiving an electronic braking request signal at an electropneumatic brake pressure modulator;

outputting a brake pressure via the brake pressure modulator; receiving the brake pressure at a protective valve unit;

outputting the brake pressure via the protective valve unit into a first brake pressure line and a second brake pressure line, which redundantly connect a brake actuator to the protective valve unit;

wherein the protective valve unit throttles or prevents the output of the brake pressure into the first brake pressure line in the event that a leakage of the first brake pressure line is determined and throttles or prevents the output of the brake pressure into the second brake pressure line in the event that a leakage of the second brake pressure line is determined.

It is to be understood that the electropneumatic device according to the first aspect of the disclosure, as well as the method according to the second aspect of the disclosure, have the same and similar sub aspects. In this respect, full reference is made to the above description relating to the first aspect of the disclosure.

For example, it is conceivable that the method further includes the steps of: determining a first brake pressure in the first brake pressure line and determining a second brake pressure in the second brake pressure line, in particular via first and second pressure sensors, and providing corresponding first and second pressure signals to an electronic control unit. Furthermore, it is conceivable that the method includes the steps of, for example, branching off a first control pressure from the first brake pressure line, which is supplied to a first pneumatically switchable valve, and branching off a second control pressure from the second brake pressure line, which is supplied to the first pneumatically switchable valve.

In a third aspect, the object stated at the outset is achieved by a commercial vehicle with an electronically controllable pneumatic braking system that has an electropneumatic device according to one of the preferred embodiments described above of an electropneumatic device according to the first aspect of the disclosure. It is to be understood that the commercial vehicle according to the third aspect of the disclosure, as well as the electropneumatic device according to the first aspect of the disclosure, have the same and similar sub aspects. In this respect, full reference is made to the above description relating to the first aspect of the disclosure. The electronically controllable pneumatic braking system of the commercial vehicle may additionally include further elements, such as in particular a central module, a unit for autonomous driving, a brake value transmitter and a parking brake module. The central module can also be configured at the same time as a rear axle modulator. In addition, a front axle modulator is preferably provided. Both the front axle modulator and the central module, which also has the functions of the rear axle modulator, and the parking brake module can be configured as an electropneumatic device. In this respect, it is also preferred that the electronically controllable pneumatic braking system includes more than one electropneumatic device of the type described above. For example, a separate protective valve unit or even two or more protective valve units can be provided both for the front axle modulator, the central module, which is also configured as a rear axle modulator, the separate rear axle modulator and the parking brake module, so that all brake actuators of the brake system are piped redundantly.

BRIEF DESCRIPTION OF DRAWINGS

The invention will now be described with reference to the drawings wherein.

DETAILED DESCRIPTION

Figure 1:
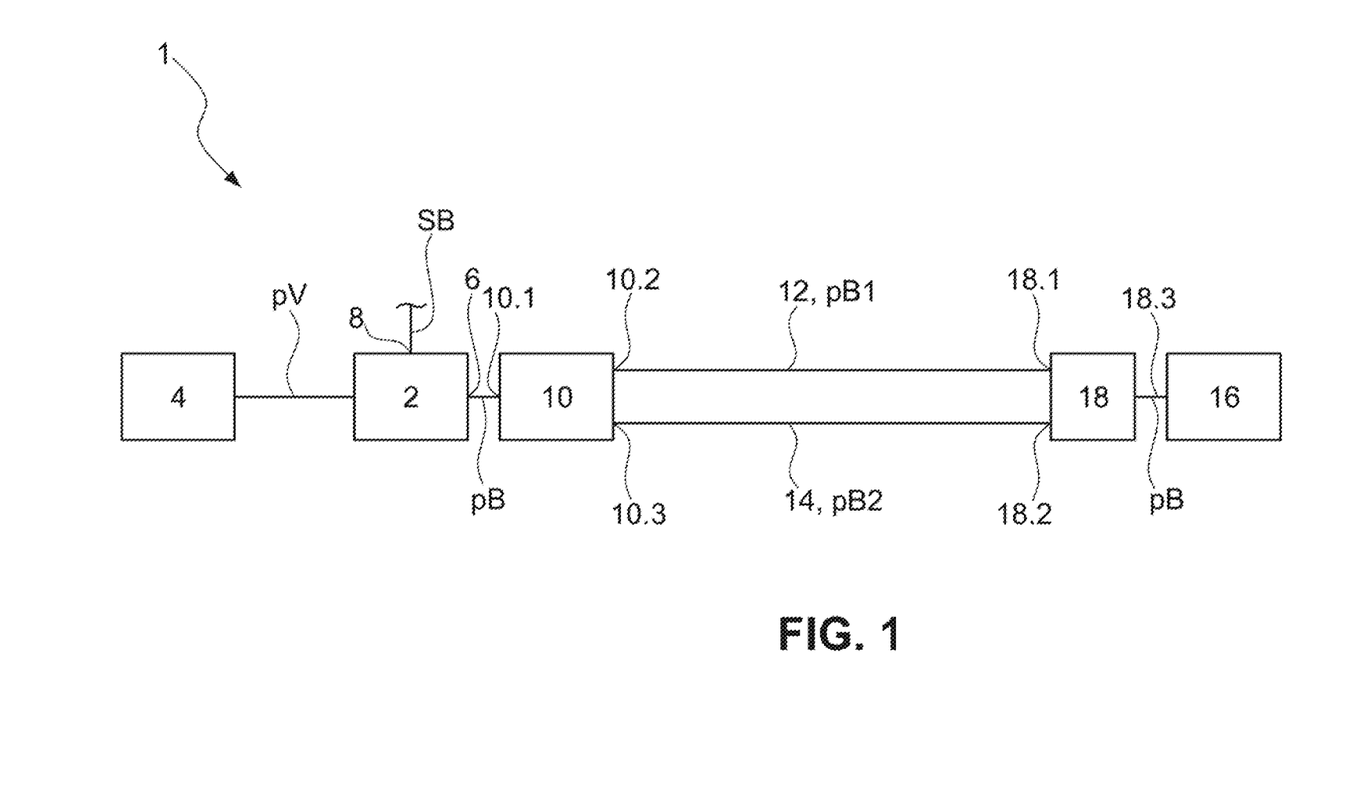
FIG. 1 shows an electropneumatic device in a first embodiment.

An electropneumatic device 1, which can be used as part of an electronically controllable pneumatic braking system 102 (cf. FIG. 9) but could also be used in purely pneumatically controlled braking systems, has an electropneumatic brake pressure modulator 2 as a central element. The electropneumatic brake pressure modulator 2 can be configured in particular as an axle modulator, such as a front axle modulator 104, rear axle modulator 106 or auxiliary axle modulator, or also as parking brake modulator 108 or trailer control valve (cf. FIG. 9 in each case). The electropneumatic brake pressure modulator 2 is connected on the input side to a compressed air reservoir 4 and receives a reservoir pressure pV from the latter. The compressed air reservoir 4 can additionally be connected to other modules, not shown here, and can provide them with a corresponding reservoir pressure.

The electropneumatic brake pressure modulator 2 has one or more valves inside, not shown here, specifically in particular and preferably a pneumatic relay valve and one or more electromagnetically switchable valves. Both the relay valve and the electromagnetically switchable valves receive the reservoir pressure pV. The electromagnetic valves are then configured to provide a control pressure at the relay valve, so that the relay valve then outputs a brake pressure pB at a brake pressure connection 6 of the electropneumatic brake pressure modulator 2 in a manner dependent on the received control pressure.

In addition, the electropneumatic brake pressure modulator 2 has an electrical connection 8 via which the electropneumatic brake pressure modulator 2 is connected to, for example, a vehicle BUS, other BUS, or other electrical line. Via the electrical connection 8, the electropneumatic brake pressure modulator 2 can receive an electrical or electronic brake signal SB, which can be, for example, a braking request signal, a deceleration request signal, a parking brake signal, or a direct electrical pulse that acts directly on one or more electromagnetically switchable valves, in the event that the electropneumatic brake pressure modulator 2 does not have its own intelligence. Depending on the brake signal SB, the brake pressure pB is then output at the brake pressure connection 6.

The brake pressure modulator 2 is connected via the brake pressure connection 6 to a protective valve unit 10, which receives this actuated brake pressure pB. The protective valve unit 10 is connected to a brake actuator 16 via a first brake pressure line 12 and a second brake pressure line 14, which are redundant in relation to each other. The brake actuator 16 can be a common service brake actuator, or for example a spring loaded part of a spring loaded brake cylinder or a combination cylinder. Although only a service brake cylinder should be described in the present case, it should be understood that similar and analogous embodiments also apply to a spring brake actuator.

The protective valve unit 10 has a protective valve inlet 10.1, a first protective valve outlet 10.2 and a second protective valve outlet 10.3. The protective valve inlet 10.1 is connected to the brake pressure connection 6 and receives therefrom the brake pressure pB output by the brake pressure modulator 2. The first brake pressure line 12 is connected to the first protective valve outlet 10.2 and the second brake pressure line 14 is connected to the second protective valve outlet 10.3. In normal operation, the protective valve unit 10 directly controls the received brake pressure pB at the first and second protective valve outlets 10.2, 10.3 so that brake pressure pB is present in the first and second brake pressure lines 12, 14, and will be referred to as first brake pressure pB1 and second brake pressure pB2 in the following. Downstream of the first and second brake pressure lines 12, 14 and upstream of the brake actuator 16, a shuttle valve 18 is provided which combines the first and second brake pressures pB1, pB2 and in turn outputs them as brake pressure pB at the brake actuator 16. The shuttle valve 18 has a first shuttle valve connection 18.1, which is connected to the first brake pressure line 12. It has a second shuttle valve connection 18.2 connected to the second brake pressure line 14. Furthermore, the shuttle valve 18 has a third shuttle valve connection 18.3 which is connected to the brake actuator 16. The shuttle valve 18 is configured as a so called select high valve and outputs the higher of the pressure applied to the first and second shuttle valve connections 18.1, 18.2 at the third shuttle valve connection 18.3.

The protective valve unit 10 is configured in such a way that, in the event that one of the first and second brake pressure lines 12, 14 has a leakage or ruptures, the protective valve outlet 10.2, 10.3 associated with this first or second brake pressure line 12, 14 is throttled. In particular, the protective valve unit 10 is configured to throttle or prevent the modulation of the first brake pressure pB1 at the first protective valve outlet 10.2 in the event of leakage or rupture of the first brake pressure line 12, and to throttle or prevent the modulation of the second brake pressure pB2 at the second protective valve outlet 10.3 in the event of leakage or rupture of the second brake pressure line 14. In this way, it is possible for the brake pressure pB to still be provided to the brake actuator 16 via the intact brake pressure line of the first and second brake pressure lines 12, 14; on the other hand, it is also possible to prevent the compressed air reservoir 4 from running dry. In this way, it can also be ensured that a vehicle, in particular an autonomous or semi-autonomous vehicle, continues to be fully functional even in the event of a fault, namely in the event of leakage or rupture of one of the two brake pressure lines 12, 14.

Figure 2:
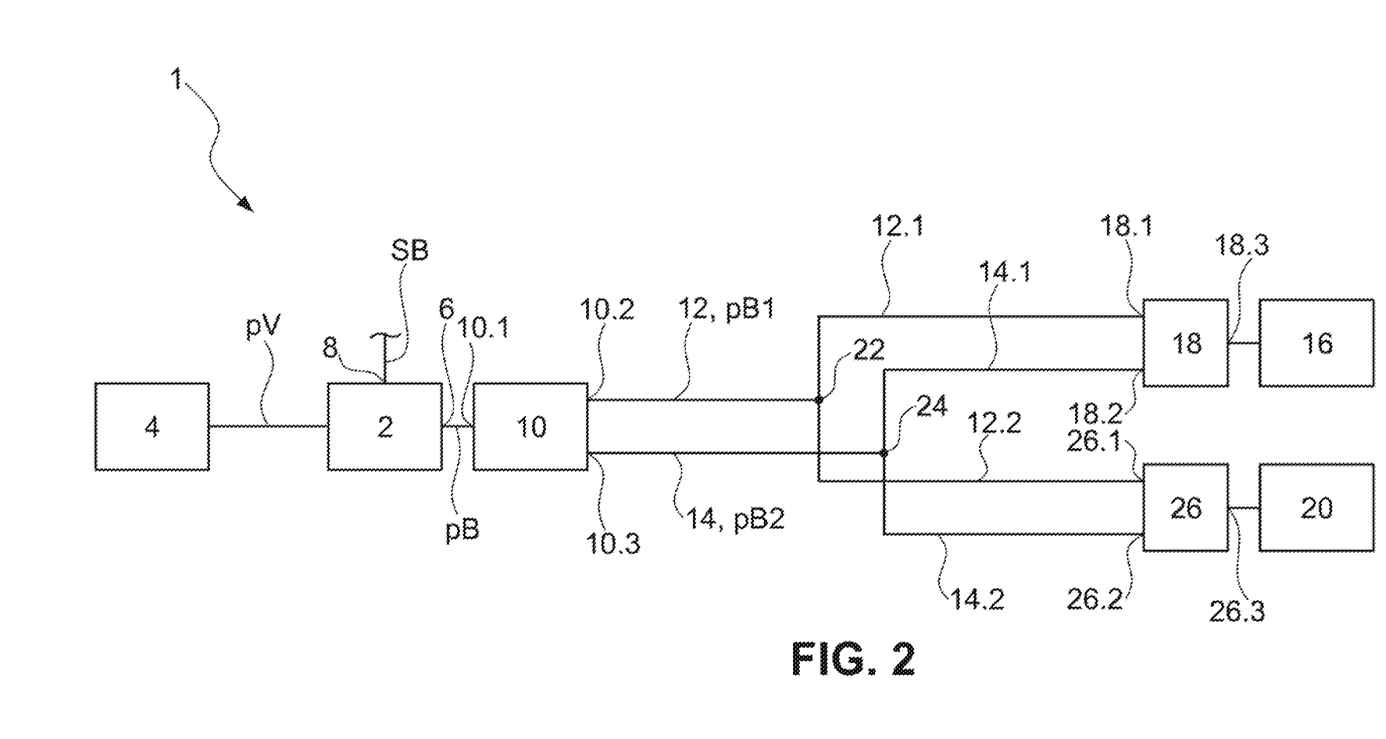
FIG. 2 shows an electropneumatic device in a second embodiment.

FIG. 2 shows an embodiment based on FIG. 1 and in this respect the same and similar elements are provided with the same reference signs. In particular, differences from the first embodiment of FIG. 1 are highlighted in the following.

In contrast to the first embodiment (FIG. 1), the second embodiment includes a second brake actuator 20 that is also supplied via the first and second brake pressure lines 12, 14. For example, the first brake actuator 16 is a brake actuator for a right wheel of an axle and the second brake actuator 20 is a brake actuator for a left wheel of the same axle. Here, the protective valve unit 10 has a single channel configuration, even though it feeds two brake pressure lines 12, 14. The same brake pressure pB is output into both brake pressure lines 12, 14 and wheel specific output is not implemented here. However, additional ABS valves can be provided to implement wheel specific and slip controlled braking.

In order to supply the brake actuators 16, 20 with brake pressure pB, a branch point 22 is provided in the first brake pressure line 12, into a first portion 12.1 of the first brake pressure line 12 and a second portion 12.2 of the first brake pressure line 12. Likewise, a second branch point 24 is provided in the second brake pressure line 14, at which the second brake pressure line 14 branches into a first portion 14.1 of the second brake pressure line 14 and a second portion 14.2 of the second brake pressure line 14. Thus, in turn, each of the first and second brake actuators 16, 20 is supplied with both brake pressure pB1 from the first brake pressure line 12 and brake pressure pB2 from the second brake pressure line 14. Downstream of the first and second brake pressure lines 12, 14 and upstream of the second brake actuator 20 is a second shuttle valve 26, which may be of the same configuration as the shuttle valve 18. The second shuttle valve 26 has a first shuttle valve connection 26.1, which is connected to the second portion 12.2 of the first brake pressure line 12, and a second shuttle valve connection 26.2, which is connected to the second portion 14.2 of the second brake pressure line 14. The third shuttle valve connection 26.3 of the second shuttle valve 26 is connected to the second brake actuator 20.

Figure 3:
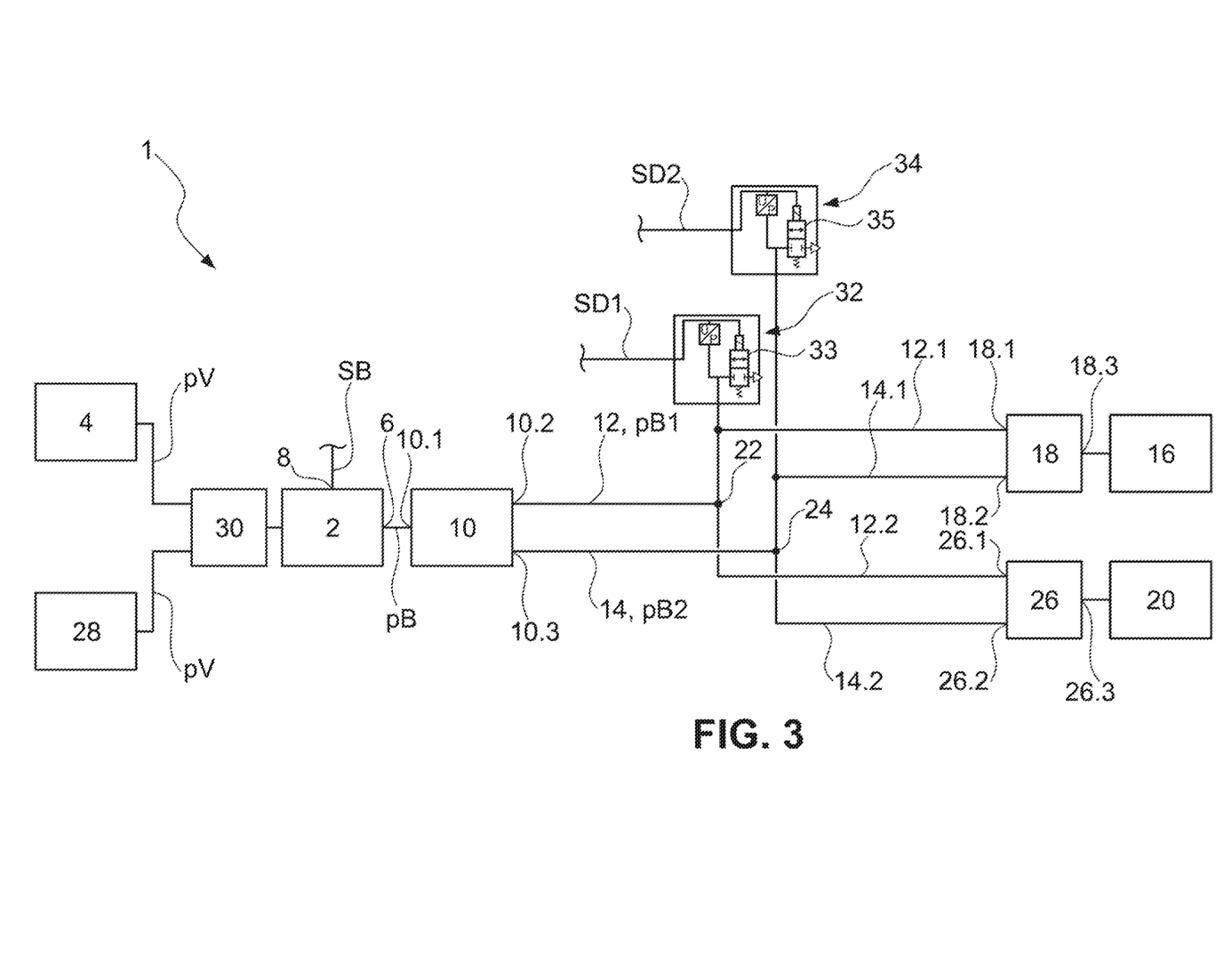
FIG. 3 shows an electropneumatic device in a third embodiment.

A third embodiment according to FIG. 3 is based substantially on the second embodiment according to FIG. 2, so that the same elements are again provided with the same reference signs. In this respect, full reference is made to the above description.

First, in addition to the compressed air reservoir 4, a second compressed air reservoir 28 is provided, which also provides reservoir pressure pV. This second compressed air reservoir 28 can be the compressed air reservoir of a second brake circuit or backup circuit. The first compressed air reservoir 4 and the second compressed air reservoir 28 are then connected to the electropneumatic brake pressure modulator 2 via a reservoir shuttle valve 30, which in turn can be configured as a select high valve. In this way, the higher of the reservoir pressure pV supplied by the first and second compressed air reservoir 4, 28 is output at the electropneumatic brake pressure modulator 2 via the reservoir shuttle valve 30.

Furthermore, according to the third embodiment (FIG. 3), the electropneumatic device 1 includes a first diagnostic unit 32 provided to detect a leakage or rupture of the first brake pressure line 12 and a second diagnostic unit 34 provided to detect a leakage or rupture of the second brake pressure line 14. The first diagnostic unit 32 provides a corresponding first diagnostic signal SD1, and the second diagnostic unit 34 provides a second diagnostic signal SD2. Preferably, the first and second diagnostic signals SD1, SD2 are provided at an electronic control unit, such as a central unit, a unit for autonomous driving or an electronic control unit of the electropneumatic brake pressure modulator 2. Preferably, the first and second diagnostic units 32, 34 are configured as pressure sensors and in this respect provide first and second pressure signals. For this purpose, the first and second diagnostic units 32, 34 are connected to the corresponding first and second brake pressure lines 12, 14. In the shown embodiment (FIG. 3), the first diagnostic unit 32 additionally has a first diagnostic valve 33 and the second diagnostic unit 34 has a second diagnostic valve 35. These valves 33, 35 can then be brought into an open switching position if the corresponding brake pressure line 12, 14 has a leak. The corresponding brake pressure line 12, 14 can then be completely vented so that the protective valve unit 10 can completely shut off the corresponding brake pressure line 12, 14. In addition, in the event that the electropneumatic device 1 is housed in an autonomous or semi-autonomous vehicle, the first and second diagnostic units 32, 34 serve to provide the autonomous unit with information about the state of the braking system so that appropriate action can be taken.

Figure 4:
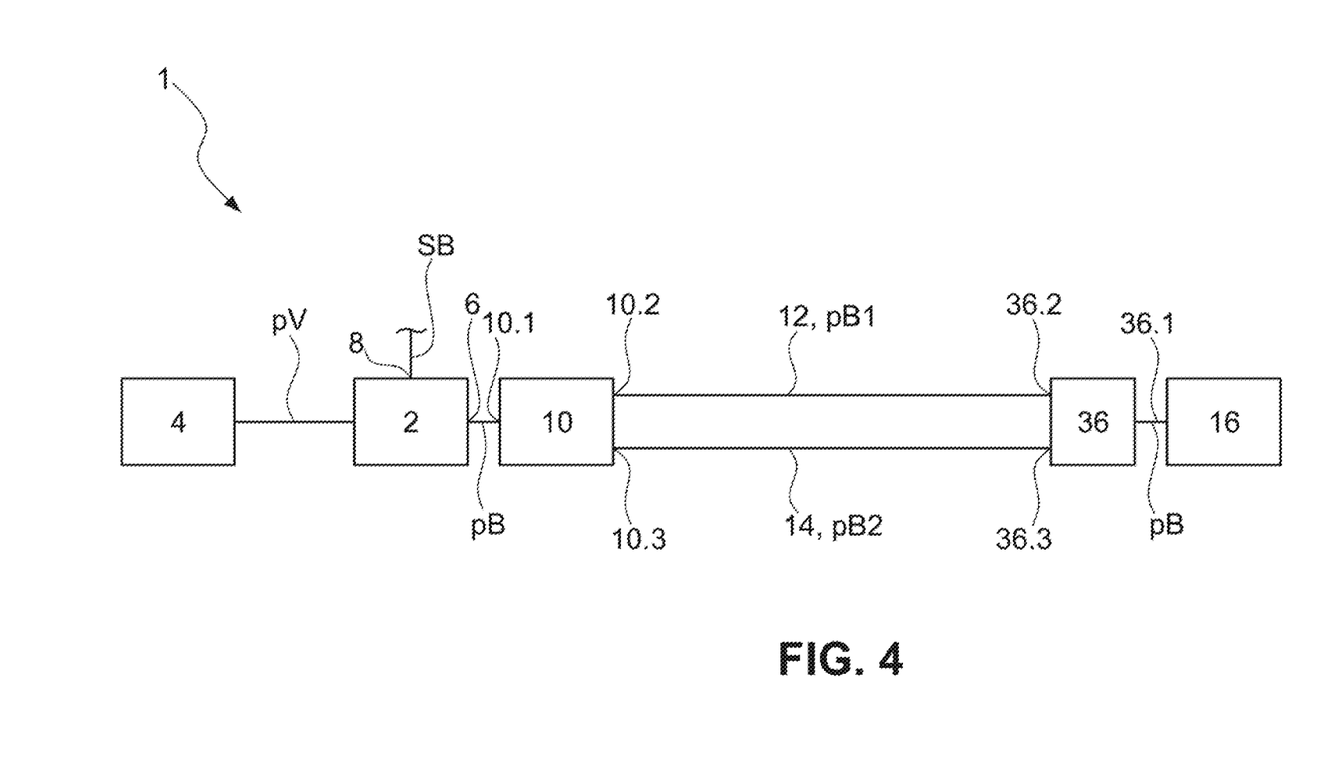
FIG. 4 shows a fourth embodiment of an electropneumatic device.

The embodiment shown in FIG. 4 is now in turn based on the first embodiment shown in FIG. 1, wherein the same and similar elements are provided with the same reference signs, and therefore full reference is made to the above description.

In contrast to the first embodiment (FIG. 1), a brake actuator protective unit 36 is provided instead of the shuttle valve 18 and has a first protective unit connection 36.1 connected to the brake actuator 16, a second protective unit connection 36.2 connected to the first brake pressure line 12, and a third protective unit connection 36.3 connected to the second brake pressure line 14. In particular, the brake actuator protective unit 36 may be identical in configuration to the protective valve unit 10, but is connected in exactly the opposite manner. In this respect, the first protective unit connection 36.1 corresponds to the protective valve inlet 10.1, the second protective unit connection 36.2 corresponds to the first protective valve outlet 10.2, and the third protective unit connection 36.3 corresponds to the second protective valve outlet 10.3. In this way, the combination of the first and second brake pressures pB1, pB2 for the brake actuator 16 can be implemented.

Figure 5:
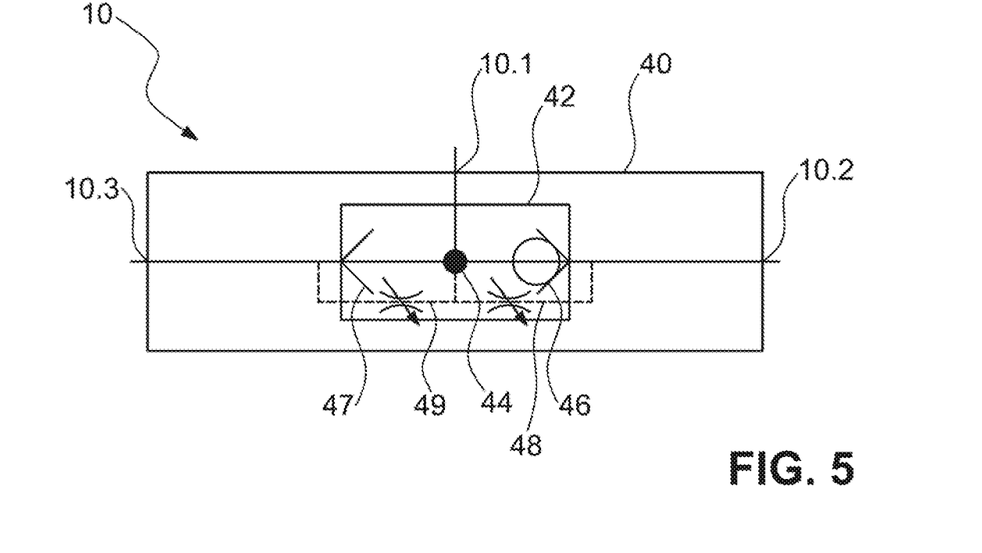
FIG. 5 shows a first embodiment of a protective valve unit.

FIG. 5 illustrates a first embodiment of a protective valve unit 10. The protective valve unit 10 has a valve body 40, which can also be referred to as a protective valve housing and forms the main body of the protective valve unit 10. In the valve body 40 there is formed a working chamber 42, into which the protective valve inlet 10.1, the first protective valve outlet 10.2 and the second protective valve outlet 10.3 open. A valve element 44 is movably arranged within the working chamber 42. The valve element 44 is shown in FIG. 5 in the right end position and rests against a first valve seat 46, which is associated with the first protective valve outlet 10.2. A second valve seat 47 is associated with the second protective valve outlet 10.3. The protective valve inlet 10.1, on the other hand, remains open. Thus, for example, if no counterpressure is generated at the first protective valve outlet 10.2 when a braking pressure pB is applied to the protective valve inlet 10.1, the valve element 44 moves to the right end position against the first valve seat 46 and shuts off the first protective valve outlet 10.2. Compressed air can then still flow from the protective valve inlet 10.1 via the working chamber 42 to the second protective valve outlet 10.3. Preferably, and according to the embodiment shown here, a first throttled bypass 48 is further provided, which connects the working chamber 42 to the first protective valve outlet 10.2, bypassing the first valve seat 46. Furthermore, a second throttled bypass 49 is provided in an analogous manner, which connects the working chamber 42 to the second protective valve outlet 10.3, bypassing the second valve seat 47. In this way, an overflow of the first and second valve seats 46, 47 is allowed, which in normal operation, when there is no leakage and no rupture of the first and second brake pressure lines 12, 14, leads to the higher stability and in particular brings the valve element 44 into a center position, between the first and second valve seats 46, 47. Basically, the protective valve unit 10 according to the first embodiment (FIG. 5) is formed based on a conventional shuttle valve, but differs from a conventional shuttle valve in particular by the first and second bypasses 48, 49.

Figure 6:
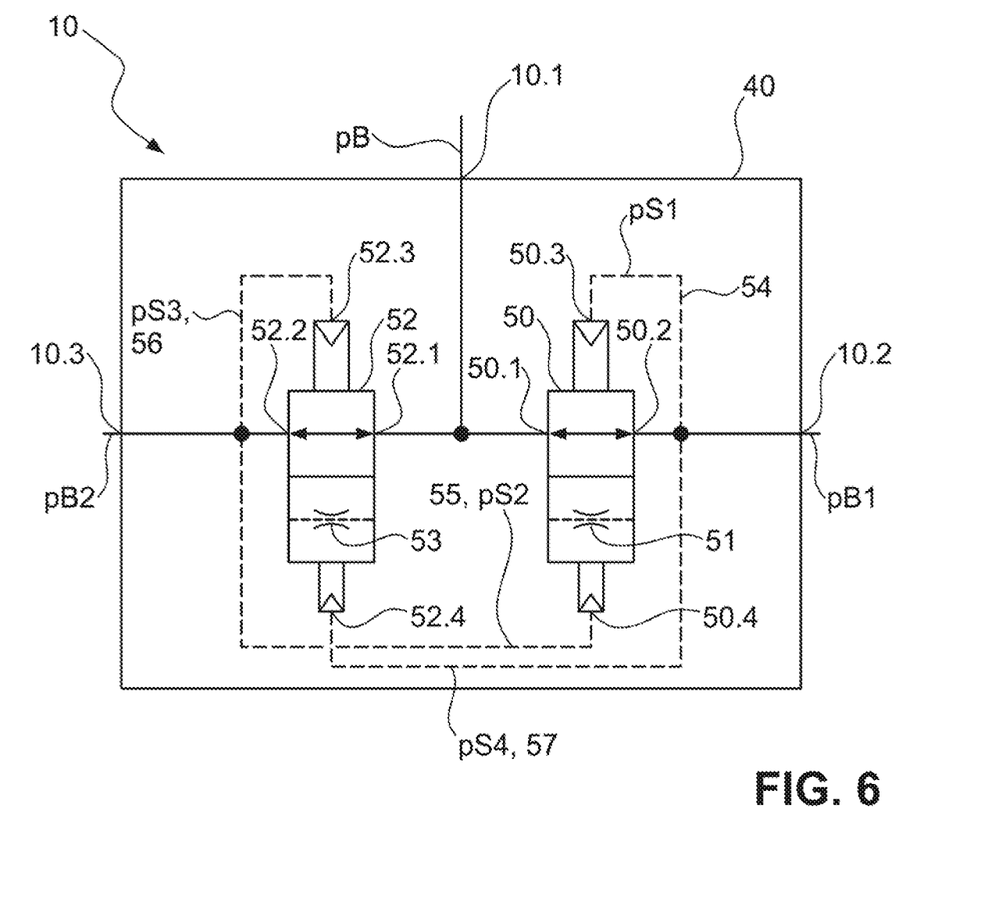
FIG. 6 shows a second embodiment of a protective valve unit.
Figure 7:
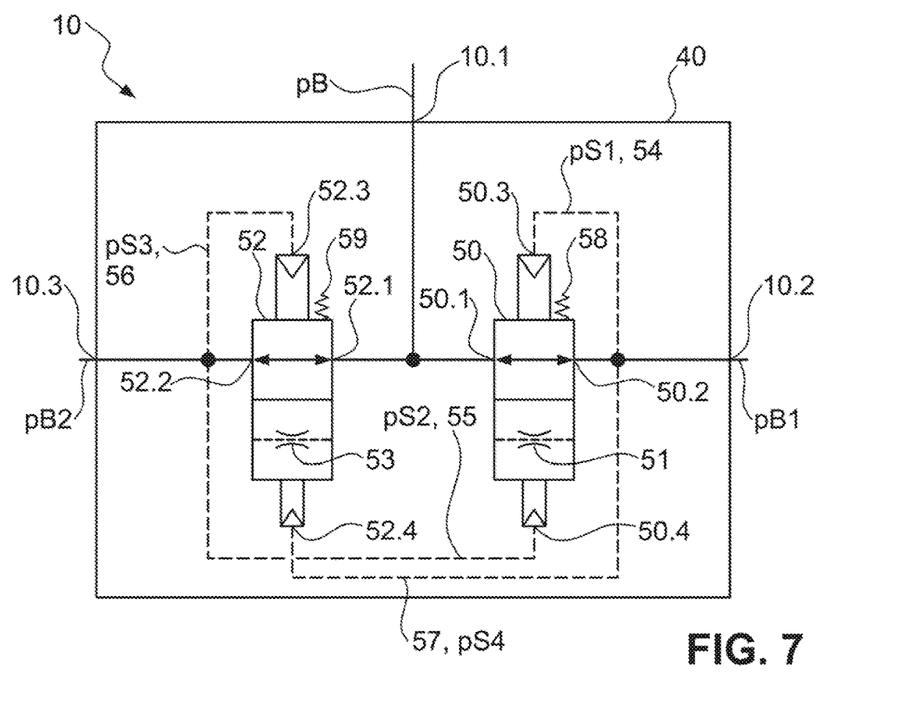
FIG. 7 shows a third embodiment of a protective valve unit.
Figure 8:
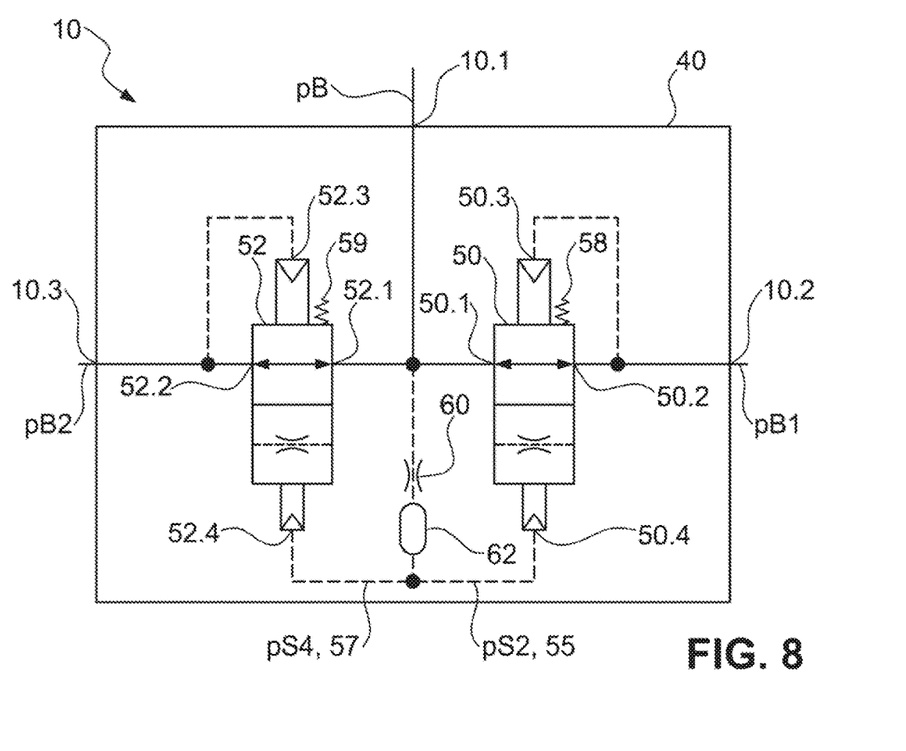
FIG. 8 shows a fourth embodiment of a protective valve unit.

FIGS. 6 to 8 show second to fourth embodiments of a protective valve unit 10 based on providing two pneumatically switchable valves.

According to the second embodiment (FIG. 6), the protective valve unit 10 is again shown in a valve body 40, wherein this is not absolutely necessary. Likewise, in this embodiment, the interconnection of the individual valve elements could also be implemented in a conventional manner without a valve body 40.

The protective valve unit 10 according to this embodiment has a first pneumatically switchable valve 50 and a second pneumatically switchable valve 52. The first pneumatically switchable valve 50 has a first switching valve connection 50.1 that is connected to the protective valve inlet 10.1. The first pneumatically switchable valve 50 further has a second switching valve connection 50.2 which is connected to the first protective valve outlet 10.2. In a first switching position shown in FIG. 6, the first and second switching valve connections 50.1, 50.2 are connected in an unthrottled manner. In a second switching position not shown in FIG. 6, the first and second switching valve connections 50.1, 50.2 are connected in a throttled manner. For this purpose, the first pneumatically switchable valve 50 has a first throttle 51. For switching the first pneumatically switchable valve 50, the latter has a first control connection 50.3 and a second control connection 50.4. The first control connection 50.3 is connected via a first control line 54 to a line downstream of the second switching valve connection 50.2 or the first protective valve outlet 10.2, and thus outputs the first brake pressure pB1 as the first control pressure pS1 at the first control connection 50.3. A second control line 55 branches off from a line between the second pneumatically switchable valve 52 and the second protective valve outlet 10.3 or from the second protective valve outlet 10.3 and thus outputs the second brake pressure pB2 as the second control pressure pS2 at the second control connection 50.4. As soon as the first control pressure pS1 exceeds a first threshold value, the first pneumatically switchable valve 50 switches into the first switching position shown in FIG. 6. However, as soon as this pressure drops, in particular below the first threshold value, but the second control pressure pS2 is above a second threshold value, the first pneumatically switchable valve 50 switches into the second switching position, not shown in FIG. 6, so that the output of pressure at the first protective valve outlet 10.2 is throttled.

Correspondingly, the second pneumatically switchable valve 52 has a third switching valve connection 52.1, a fourth switching valve connection 52.2, a third control connection 52.3, and a fourth control connection 52.4. Again, the first switching position of the second pneumatically switchable valve 52 shown in FIG. 6 is not throttled, while the second switching position not shown in FIG. 6 is throttled. For this purpose, the second pneumatically switchable valve 52 has a second throttle 53. A third control line 56 branches off from the same point as the second control line 55, even if this is not necessary, but in any case outputs the second brake pressure pB2 as the third control pressure pS3 at the third control connection 52.3. A fourth control line 57 branches off from the same point as the first control line 54, even if this is not necessary, but in any case outputs the first brake pressure pB1 at the fourth control connection 52.4 as the fourth control pressure pS4. Again, if the third control pressure pS3 exceeds a third threshold value, the second pneumatically switchable valve 52 is switched to the first switching position shown in FIG. 6, while it is switched to the second switching position not shown in FIG. 6 if the third control pressure pS3 falls below the threshold value but the fourth control pressure pS4 is above a fourth threshold value.

A third embodiment of a protective valve unit 10 is based on the second embodiment (FIG. 6), so that the same and similar elements are provided with the same reference signs.

In this respect, full reference is made to the above description of the second embodiment of the protective valve unit 10 (FIG. 6).

In contrast to the second embodiment (FIG. 6), in the third embodiment (FIG. 7), a first spring 58 is additionally provided on the first pneumatically switchable valve 50, which spring loads the first pneumatically switchable valve 50 into the first switching position shown in FIG. 7. Likewise, a second spring 59 is provided on the second pneumatically switchable valve 52, which spring loads the second pneumatically switchable valve 52 into the first switching position shown in FIG. 7. In this way, it can be ensured that no undefined state of the first and second pneumatically switchable valves 50, 52 occurs at equally high first and second brake pressures pB1, pB2, but that the first switching position is stably assumed.

A fourth embodiment of the protective valve unit 10 is based in principle on the second embodiment (FIG. 6), but may additionally have the first and second springs 58, 59 as described in the third embodiment (FIG. 7). However, this is only optional in the fourth embodiment (FIG. 8).

The main difference between the fourth embodiment (FIG. 8) and the second and third embodiment (FIG. 6, FIG. 7) is the layout of the second and fourth control connections 50.4, 52.4. While in the second and third embodiment (FIG. 6, FIG. 7) the second control connection 50.4 of the first pneumatically switchable valve 50 is supplied with the second brake pressure pB2 and the fourth control connection 52.4 of the second pneumatically switchable valve 52 is supplied with the first brake pressure pB1, these two control connections 50.4, 52.4 in the fourth embodiment (FIG. 8) are supplied with the brake pressure output at the protective valve inlet 10.1, preferably throttled. Thus, while in the second and third embodiments (FIG. 6, FIG. 7) both the first and the second pneumatically switchable valves 50, 52 are in the second switching position in the event of leakage from both brake pressure lines 12, 14, the second switching position of the pneumatically switchable valves 50, 52 in the fourth embodiment (FIG. 8) is not dependent on the brake pressure pB1, pB2 output by the protective valve unit 10, but on the brake pressure pB received by the protective valve unit 10, which is output by the brake pressure modulator 2 at the protective valve inlet 10.1.

For this purpose, in the fourth embodiment, the second control line 55 runs as a branch from the protective valve inlet 10.1 and the fourth control line 57 also runs as a branch from the protective valve inlet 10.1. A third throttle 60 is also connected between the protective valve inlet 10.1 and the second and fourth control lines 55, 57, respectively, as well as an enlarged volume 62, wherein it is not absolutely necessary that both are provided, if necessary, one of the third throttle 60 and the enlarged volume 62 may also be sufficient. The protective valve unit 10 according to the disclosure can also be implemented in this way.

It should be understood that the protective valve unit 10, as shown in FIGS. 5 to 8, can also be independent of the electropneumatic device of FIGS. 1 to 4. In this respect, the protective valve unit 10 is independent of the further elements shown in FIGS. 1 to 4, in particular of the brake pressure modulator 2, the first and second brake pressure lines 12, 14, the shuttle valve 18 and the brake actuator 16. A unit formed of the brake pressure modulator 2 and the protective valve unit 10 as well as the protective valve unit 10 together with the first and second brake pressure lines 12, 14 and, where applicable, the brake pressure modulator 2 is also disclosed.

Figure 9:
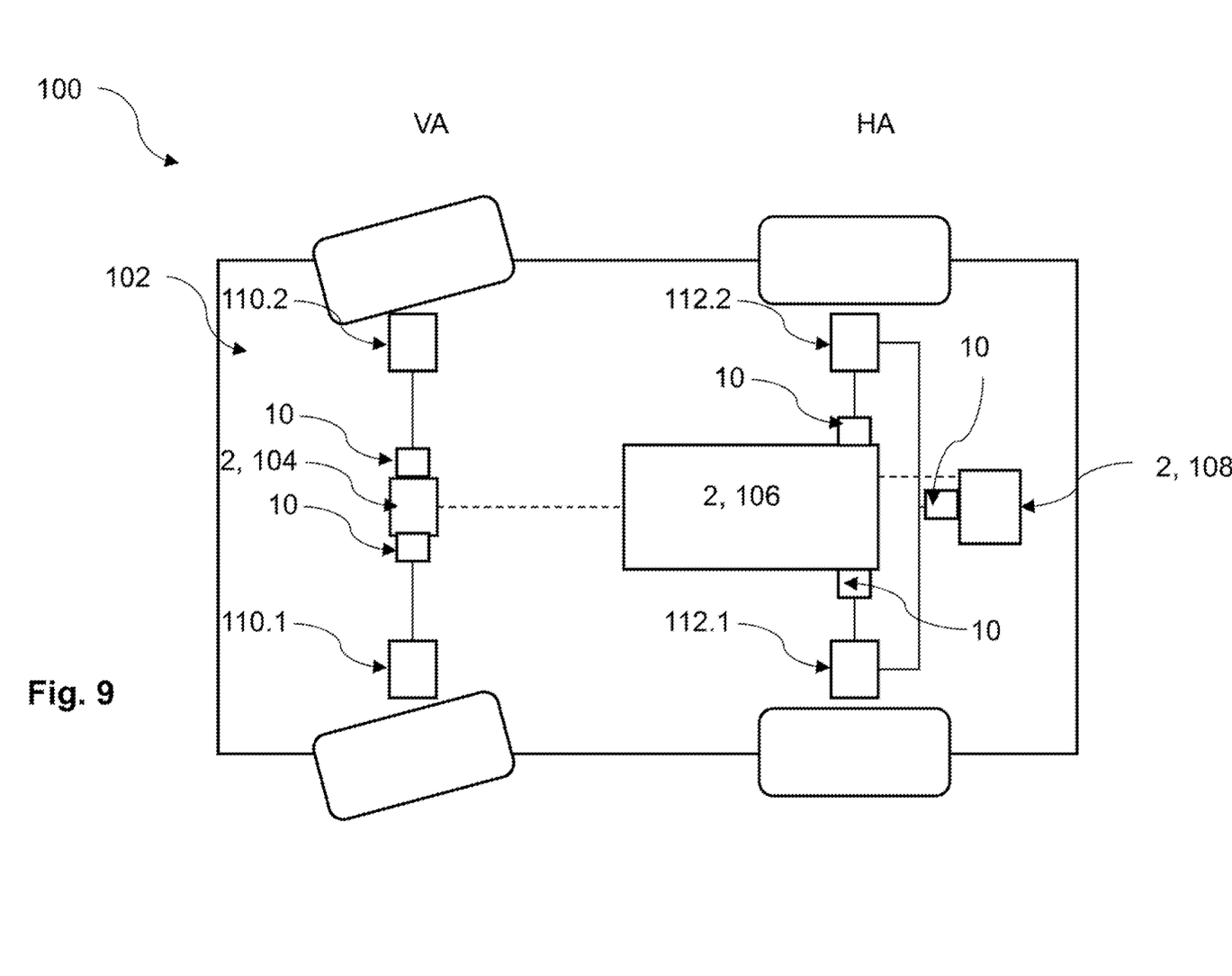
FIG. 9 shows a commercial vehicle with an electronically controllable pneumatic braking system.

FIG. 9 shows an overview of a commercial vehicle 100 having an electronically controllable pneumatic braking system 102. The commercial vehicle has a front axle VA and a rear axle HA, but it is to be understood that it may additionally have other axles, such as auxiliary axles not shown. It may further be provided with a trailer control valve, not shown, for supplying power to a trailer, not shown.

The brake system 102 has a front axle modulator 104, a central module that also functions as a rear axle modulator 106, and a parking brake modulator 108. These modules each form brake pressure modulators 2 of the type described above, wherein also only one or two of these modules may be so formed. Each of the brake pressure modulators 2 is associated with a brake circuit having a separate compressed air reservoir, which are not shown here for reasons of clarity.

The front axle modulator 104 has two channels and includes a protective valve unit 10 for the left front wheel, with which a first brake actuator 16 in the form of a first service brake actuator 110.1 is associated. Likewise, a second brake actuator 20 in the form of a second service brake actuator 110.2 is associated with the right front wheel, which is also connected to a protective valve unit 10. During operation, the rear axle is supplied by the rear axle modulator 106, which is also of two channel configuration and supplies a first combined service brake and spring brake actuator 112.1 at the left rear wheel via a first channel and a protective valve unit 10, and supplies a second combined service brake and spring brake actuator 112.2 at the right rear wheel via a second channel and a protective valve unit 10.

Furthermore, the parking brake modulator 108 is provided with a protective valve unit 10 and is of single channel configuration. The parking brake modulator 108 actuates the spring brake actuators of the combined service brake and spring brake actuators 112.1, 112.2 at the rear axle HA.

In the event that the protective valve units 10 are equipped with diagnostic units 32, 34, as described with reference to FIG. 3, these are preferably connected to any electronic control unit of the associated brake pressure modulator 2 and/or to the central module.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 electropneumatic device
2 electropneumatic brake pressure modulator
4 compressed air reservoir
6 brake pressure connection
8 electrical connection
10 protective valve unit
10.1 protective valve inlet
10.2 first protective valve outlet
10.3 second protective valve outlet
12 first brake pressure line
12.1 first portion of the first brake pressure line
12.2 second portion of the first brake pressure line
14 second brake pressure line
14.1 first portion of the second brake pressure line
14.2 second portion of the second brake pressure line
16 brake actuator
18 shuttle valve 18.1 first shuttle valve connection
18.2 second shuttle valve connection
18.3 third shuttle valve connection
20 second brake actuator
22 first branch point
24 second branch point
26 second shuttle valve
26.1 first shuttle valve connection
26.2 second shuttle valve connection
26.3 third shuttle valve connection
28 second compressed air reservoir
30 supply shuttle valve
32 first diagnostic unit
33 first diagnostic valve
34 second diagnostic unit
35 second diagnostic valve
36 brake actuator protective unit
36.1 first protective unit connection
36.2 second protective unit connection
36.3 third protective unit connection
40 valve body
42 working chamber
44 valve element
46 first valve seat
47 second valve seat
48 first throttled bypass
49 second throttled bypass
50 first pneumatically switchable valve
50.1 first switching valve connection
50.2 second switching valve connection
50.3 first control connection
50.4 second control connection
51 first throttle
52 second pneumatically switchable valve
52.1 third switching valve connection
52.2 fourth switching valve connection
52.3 third control connection
52.4 fourth control connection
53 second throttle
54 first control line
55 second control line
56 third control line
57 fourth control line
58 first spring
59 second spring
60 third throttle
62 enlarged volume
100 commercial vehicle
102 electronically controllable pneumatic braking system
104 front axle modulator
106 rear axle modulator (central module)
108 parking brake modulator
110.1 first service brake actuator
110.2 second service brake actuator
112.1 first service brake and spring brake actuator
112.2 second service brake and spring brake actuator
VA front axle
HA rear axle
pB brake pressure
pB1 first brake pressure
pB2 second brake pressure
pS1 first control pressure
pS2 second control pressure
pS3 third control pressure
pS4 fourth control pressure
pV reservoir pressure
SB brake signal
SD1 first diagnostic signal
SD2 second diagnostic signal

The invention claimed is:

1. An electropneumatic device for an electronically controllable pneumatic braking system, the electropneumatic device comprising:
a compressed air reservoir for providing a reservoir pressure;
an electropneumatic brake pressure modulator configured to receive the reservoir pressure from said compressed air reservoir and to output a brake pressure at a brake pressure connection in a manner dependent on electronic braking request signals;
a protective valve unit having a protective valve inlet, a first protective valve outlet, and a second protective valve outlet, wherein said protective valve inlet is connected to said brake pressure connection of said brake electropneumatic pressure modulator, is configured to receive the brake pressure, and is configured to provide the brake pressure at said first protective valve outlet and said second protective valve outlet;
a first brake pressure line connected to said first protective valve outlet and a second brake pressure line connected to said second protective valve outlet;
at least one brake actuator connected to said first brake pressure line and said second brake pressure line for receiving the brake pressure; and,
said protective valve unit being configured to throttle or prevent the brake pressure output at said first protective valve outlet in an event of leakage of said first brake pressure line and to throttle or prevent the brake pressure output at said second protective valve outlet in an event of leakage of said second brake pressure line.

2. The electropneumatic device of claim 1 further comprising a shuttle valve connected to said first pressure line and said second brake pressure line and to said brake pressure actuator.

3. The electropneumatic device of claim 1, wherein said protective valve unit is directly arranged on or integrated with said electropneumatic brake pressure modulator.

4. The electropneumatic device of claim 1 further comprising:
a second brake actuator connected to said first brake pressure line and said second brake pressure line for receiving the brake pressure; and,
a second shuttle valve arranged between said second brake pressure actuator and said first and second brake pressure lines.

5. The electropneumatic device of claim 1 further comprising a second compressed air reservoir connected to said electropneumatic brake pressure modulator and configured to provide a second reservoir pressure at said electropneumatic brake pressure modulator.

6. The electropneumatic device of claim 1 further comprising:
a first diagnostic unit for determining a leakage of said first brake pressure line and a second diagnostic unit for determining a leakage of said second brake pressure line, wherein said first diagnostic unit and said second diagnostic units are connected to a common electronic control unit.

7. The electropneumatic device of claim 1 further comprising a brake actuator protective unit connected to said first brake pressure line and said second brake pressure line and to said brake pressure actuator.

8. The electropneumatic device of claim 1, wherein said protective valve unit has a valve body which includes said protective valve inlet, said first protective valve outlet, said second protective valve outlet, a work chamber in which a valve element is movably arranged between said first protective valve outlet and said second protective valve outlet and, in a first end position, rests against a first valve seat associated with said first protective valve outlet and, in a second end position, rests against a second valve seat associated with said second protective valve outlet; and, said protective valve unit further has a first throttled bypass connecting said protective valve inlet to said first protective valve outlet and a second throttled bypass connecting said protective valve inlet to said second protective valve outlet.

9. The electropneumatic device of claim 1, wherein said protective valve unit has a first pneumatically switchable valve and a second pneumatically switchable valve; said first pneumatically switchable valve is associated with said first brake pressure line and said second pneumatically switchable valve is associated with said second brake pressure line; said first pneumatically switchable valve is configured to throttle or block said brake pressure output at said first protective valve outlet in the event of leakage of said first brake pressure line; and, said second pneumatically switchable valve is configured to throttle or block said brake pressure output at said second protective valve outlet in the event of leakage of said second brake pressure line.

10. The electropneumatic device of claim 9, wherein:
said first pneumatically switchable valve has a first switching position, a second switching position, a first control connection, and a second control connection;
said first pneumatically switchable valve is loaded into said first switching position when a first control pressure is output at said first control connection and is loaded into said second switching position when a second control pressure is output at said second control connection; and,
said second pneumatically switchable valve has a third switching position, a fourth switching position, a third control connection and a fourth control connection;
said second pneumatically switchable valve is loaded into said third switching position when a third control pressure is output at said third control connection and is loaded into said second switching position when a fourth control pressure is output at said fourth control connection.

11. The electropneumatic device of claim 10, wherein the first control pressure corresponds to a first brake pressure or a pressure derived from the first brake pressure; and, the third control pressure corresponds to a second brake pressure or a pressure derived from the second brake pressure.

12. The electropneumatic device of claim 10, wherein the second control pressure corresponds to a second brake pressure or a pressure derived from the second brake pressure and the fourth control pressure corresponds to a first brake pressure or a pressure derived from the first brake pressure; or, wherein the second control pressure and the fourth control pressure correspond to a pressure applied to said protective valve inlet or derived from the pressure applied to said protective valve inlet.

13. The electropneumatic device of claim 9, wherein said first pneumatically switchable valve and said second pneumatically switchable valve are spring biased into an open, non-throttled switching position.

14. The electropneumatic device of claim 12, wherein at least one of a throttle and an enlarged control volume is formed between said protective valve inlet and at least one of said second control connection and said fourth control connection.

15. The electropneumatic device of claim 1, wherein said electropneumatic brake pressure modulator is an axle modulator and said at least one brake actuator is a service brake actuator.

16. The electropneumatic device of claim 1, wherein said electropneumatic brake pressure modulator is a parking brake modulator and said at least one brake actuator is a spring brake actuator.

17. A method for outputting a brake pressure in an electronically controllable pneumatic braking system in a manner that protects against line rupture, the method comprising:
receiving an electronic braking request signal at an electropneumatic brake pressure modulator;
outputting a brake pressure via the electropneumatic brake pressure modulator;
receiving the brake pressure at a protective valve unit;
outputting the brake pressure via the protective valve unit in a first brake pressure line and a second brake pressure line, which redundantly connect a brake actuator to the protective valve unit; and,
wherein the protective valve unit throttles or prevents the output of the brake pressure into the first brake pressure line in an event that leakage of the first brake pressure line is determined, and throttles or prevents the output of the brake pressure into the second brake pressure line in an event that leakage of the second brake pressure line is determined.

18. A commercial vehicle comprising:
an electronically controllable pneumatic braking system including an electropneumatic device having a compressed air reservoir for providing a reservoir pressure;
said electropneumatic device further having an electropneumatic brake pressure modulator configured to receive the reservoir pressure from said compressed air reservoir and to output a brake pressure at a brake pressure connection in a manner dependent on electronic braking request signals;
said electropneumatic device further having a protective valve unit having a protective valve inlet, a first protective valve outlet, and a second protective valve outlet, wherein said protective valve inlet is connected to said brake pressure connection of said brake electropneumatic pressure modulator, is configured to receive the brake pressure, and is configured to provide the brake pressure at said first protective valve outlet and said second protective valve outlet;
said electropneumatic device further having a first brake pressure line connected to said first protective valve outlet and a second brake pressure line connected to said second protective valve outlet;
said electropneumatic device further having at least one brake actuator connected to said first brake pressure line and said second brake pressure line for receiving the brake pressure; and,
said protective valve unit being configured to throttle or prevent the brake pressure output at said first protective valve outlet in an event of leakage of said first brake pressure line and to throttle or prevent the brake pressure output at said second protective valve outlet in an event of leakage of said second brake pressure line.

* * * * *